Feb. 16, 1926. 1,572,942
R. R. McGREGOR
RADIATOR AND LAMP FENDER FOR AUTOMOBILES
Filed April 10, 1925 2 Sheets-Sheet 1
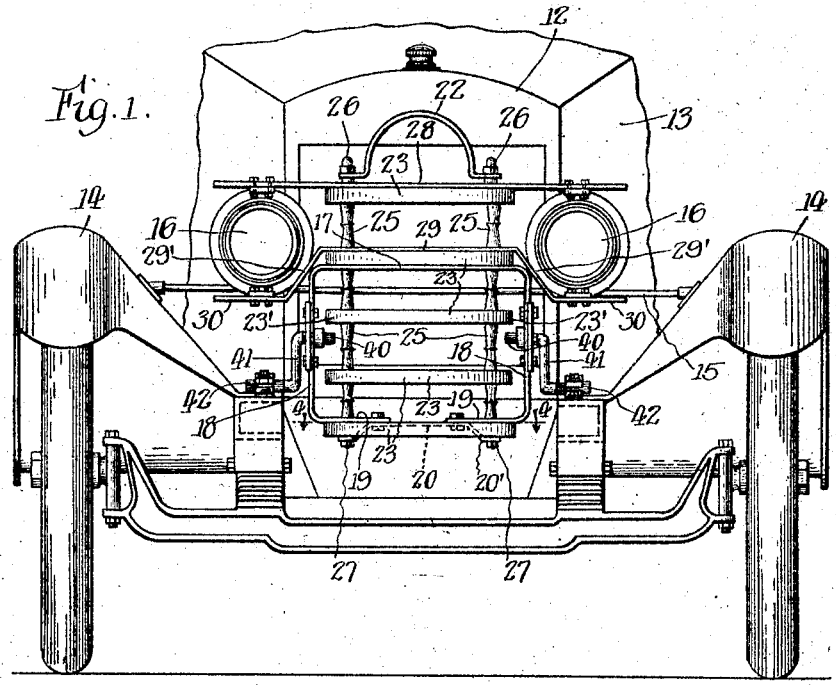
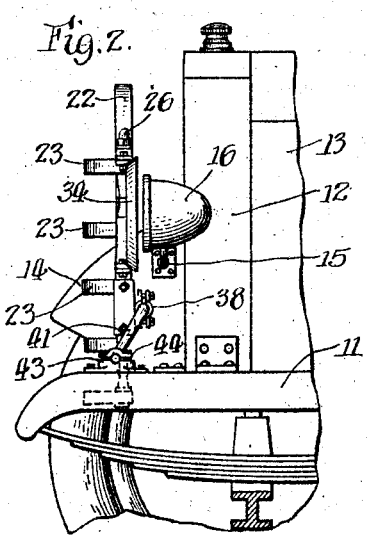
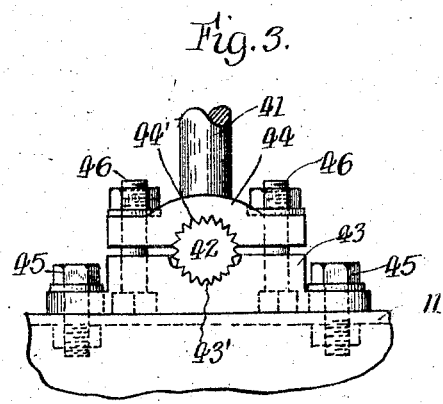
Inventor:
Robert Roy McGregor,
By Samuel N. Pond, Atty.

Feb. 16, 1926.
R. R. McGREGOR
1,572,942
RADIATOR AND LAMP FENDER FOR AUTOMOBILES
Filed April 10, 1925   2 Sheets-Sheet 2
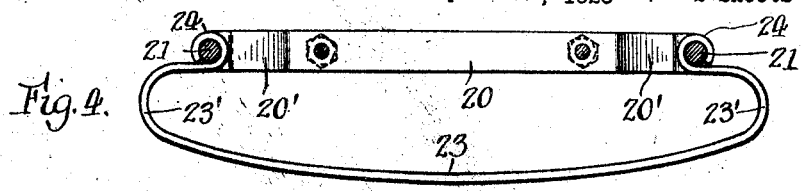
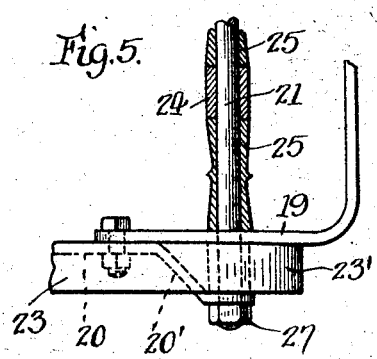
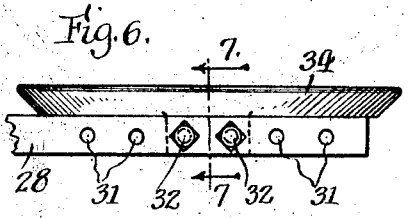
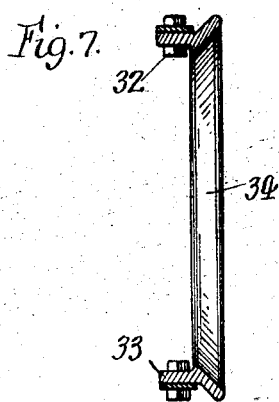
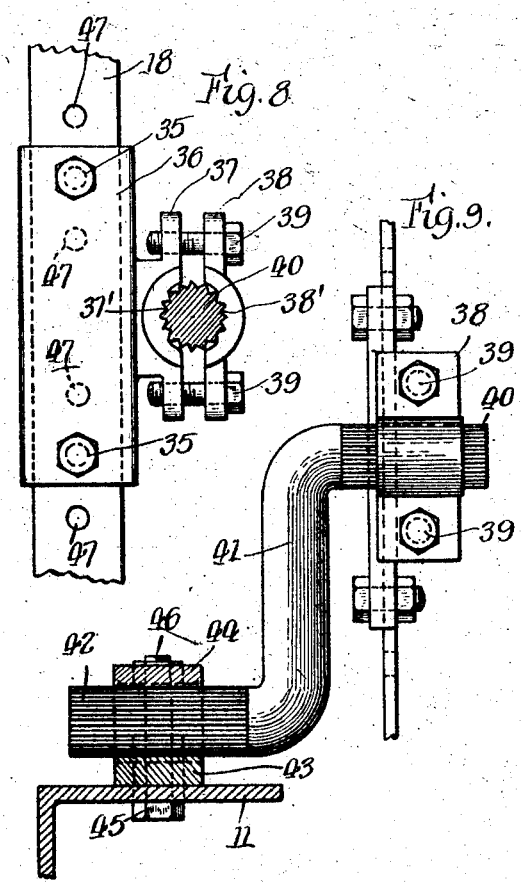
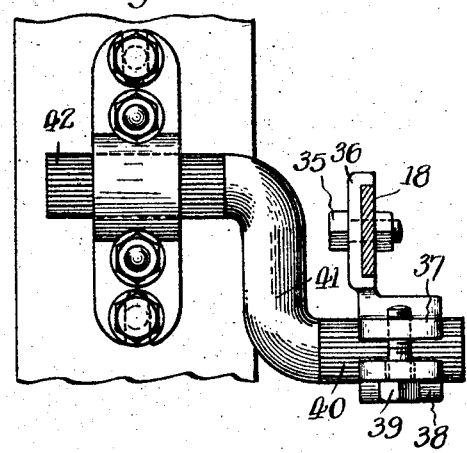
Inventor:
Robert Roy McGregor,
By Samuel N. Pond, Atty.

Patented Feb. 16, 1926.

1,572,942

UNITED STATES PATENT OFFICE.

ROBERT ROY McGREGOR, OF CHICAGO, ILLINOIS.

RADIATOR AND LAMP FENDER FOR AUTOMOBILES.

Application filed April 10, 1925. Serial No. 22,039.

*To all whom it may concern:*

Be it known that I, ROBERT ROY MC-GREGOR, a citizen of the United States, residing at Chicago, in the county of Cook and State of Illinois, have invented certain new and useful Improvements in Radiator and Lamp Fenders for Automobiles, of which the following is a specification.

This invention relates to the art of protective devices for automobiles, having reference more particularly to devices intended to guard the radiator and headlight lamps from injury due to collisions.

In its general character, purpose and organization the device of my present invention is quite similar to a radiator and lamp fender forming the subject-matter of an earlier application filed by me on the 28th day of March, 1925, Serial No. 18,963; and, in common with the device of the aforesaid application, has for its principal objects to provide a simple and efficient fender or guard for the radiator that shall be mounted and supported wholly on the side frame bars of the chassis without requiring any attachment to or support from the radiator itself; to provide, in association with such radiator fender, simple and efficient fenders or guards for the main headlight lamps which are usually located on either side of and slightly in advance of the radiator; to provide an improved structure of radiator fender combining simplicity of construction with ample strength and an elastic yielding or resilient impact surface which shall cushion collision blows encountered thereby; to provide improved means for mounting and supporting the fender on the side frame bars of the chassis with capacity of both vertical and horizontal adjustment whereby to adapt the fender to different heights of radiator above the frame bars; to provide a fender that may be removed, when required, by withdrawing a few fastening bolts; and to provide a combined radiator and lamp fender or guard possessing an artistic and attractive appearance that will please the eye and harmonize with the ornamental appearance of the automobile itself. More specific objects, peculiar to the present invention, are to provide an improved structure of radiator fender or guard employing spaced horizontally disposed spring bars; to provide an improved fender frame structure for carrying the fender bars; to provide an improved, rigid supporting means for the fender that will permit easy adjustment of the latter toward and from the front of the radiator; to provide an improved form of headlight fender; and to provide improved means for mounting and supporting the headlight fenders on and from the radiator fender with capacity of sidewise adjustment to adapt them to headlights spaced a greater or less distance apart.

Still other objects and attendant advantages of the invention will be apparent to persons skilled in the art as the same becomes better understood by reference to the following description, taken in connection with the accompanying drawings wherein I have illustrated one practical and approved embodiment of the invention, and in which—

Fig. 1 is a front elevation of an automobile equipped with my improved radiator and lamp fender;

Fig. 2 is a side elevation thereof viewed from the right of Fig. 1;

Fig. 3 is an enlarged outer side elevation of the trunnion grip for the supporting arms of the fender that is mounted on a side frame bar of the chassis;

Fig. 4 is an enlarged top plan view of the lowermost spring fender bar in horizontal section through the fender frame on the line 4—4 of Fig. 1;

Fig. 5 is an enlarged detail of the lower right hand corner portion of the radiator fender, in vertical section through one of the spacing sleeves of the fender bars;

Fig. 6 is an enlarged top plan view of one of the headlight fenders and its upper supporting bar;

Fig. 7 is a central vertical section through the same headlight fender on the line 7—7 of Fig. 6;

Fig. 8 is an enlarged fragmentary side elevation of the radiator fender frame, showing a vertically adjustable bracket thereon which carries the upper trunnion grip of the fender supporting arm;

Fig. 9 is an enlarged elevation, in vertical section through the lower trunnion grip, of the means for adjustably mounting and supporting the radiator fender on the side frame bars of the chassis; and Fig. 10 is a top plan view of Fig. 9, in cross-section through one vertical side member of the radiator fender frame.

Referring to the drawings, 11 designates each of the usual side frame bars of an automobile chassis, and 12 a conventional form of radiator located just in advance of the usual engine hood or bonnet 13. 14 designates the front wheel mud guards or fenders, the inner sides of which are, as is common on many automobiles, connected by a rigid tie-rod 15, on which latter are supported the headlight lamps 16 lying on either side of and slightly in advance of the radiator 12.

My improved radiator guard or fender is preferably constructed substantially as follows. A flat metal bar is bent to provide an upper horizontal limb 17, vertical side limbs 18, and inwardly extending bottom limb sections 19, the inner ends of which are rigidly united and joined by a flat bar 20 of the same stock as that forming the limbs 17, 18 and 19, thus forming a substantially rectangular guard frame, and the end portions of the bottom bar 20 are inclined downwardly and outwardly beneath the lower limb sections 19, as shown at 20'. Through registering holes in the limbs 17 and 19 and the end portions 20' of the bar 20 are passed a pair of vertical tie-rods 21, the upper end portions of which extend to a considerable height above the limb 17 and at their upper ends are connected by an upper cross-bar 22 preferably bent upwardly in substantially semi-circular form, as clearly shown in Fig. 1.

A plurality of spaced horizontal spring fender bars 23 slightly bowed forwardly throughout the greater part of their length and formed with loop-shaped end portions 23' are mounted on the tie-rods 21 within, above and below the guard frame, preferably by integral curled ends or eyes 24 encircling the rods 21; and the fender bars 23 are rigidly spaced by means of spacing sleeves 25 mounted on the rods 21 between adjacent fender bars. The eyes 24 of the lowermost fender bar 23 are confined between the lower and upper sides of the frame elements 19 and 20', as clearly shown in Fig. 5, and the upper and lower ends of the spacing rods 21 are threaded to receive nuts 26 and 27.

With the radiator guard constructed as above-described is preferably associated a headlight fender or guard preferably constructed as follows. Mounted on the vertical tie-rods 21 by means of suitable apertures through which said tie-rods pass are upper and lower flat horizontal bars 28 and 29 herein shown as lying directly above the topmost and next to the topmost fender bars 23, respectively. In the arrangement shown, the lower bar 28 is bent to form downwardly and outwardly inclined portions 29' clearly shown in Fig. 1 terminating in end portions 30 beneath and parallel with the end portions of the upper straight bar 28. The end portions of the bars 28 and 29 are preferably formed with a plurality of spaced bolt holes 31, clearly shown in Fig. 6; and between these end portions and attached thereto by bolts 32 is the circular rim 33 of a circular headlight guard or fender 34; and this latter, as clearly shown in Fig. 7, preferably has a rearwardly and outwardly flaring or tapered form in cross-section, lying directly in front of the fastening rim of the headlight lens. The described structure of headlight fender support manifestly provides means whereby the fenders can be adjusted inwardly and outwardly relatively to the sides of the radiator fender to fit headlights spaced a greater or less distance apart.

The combined radiator and lamp guard constructed as above-described is supported wholly upon and from the side frame bars 11 of the chassis by the adjustable means best illustrated in the detail views Figs. 8, 9 and 10. Describing this mechanism, strongly attached to each of the vertical frame members 18 as by bolts 35 is the channeled base 36 of one member 37 of an internally toothed trunnion grip or clamp, the other member 38 of which is secured thereto by bolts 39. The mating members 37 and 38 of the clamp are formed with internally toothed half bearings 37' and 38' respectively that receive between them a longitudinally toothed horizontally extending trunnion 40 of an upright supporting arm 41. On the lower end of the arm 41 is an oppositely extending longitudinally toothed horizontal trunnion 42 that is mounted in a similar trunnion grip or clamp that is in turn rigidly mounted upon the side frame bar 11 in the manner clearly shown in Figs. 3, 9 and 10. This lower trunnion grip or clamp is structurally identical with a similar device disclosed in my former application above-identified, and consists of a lower bearing block 43 formed in its upper surface with a toothed half bearing 43', and an upper clamp block 44 formed in its lower surface with a toothed half bearing 44'. The bearing block 43 is secured to the frame bar 11 by bolts 45 at its opposite ends, and the clamp block 44 is locked on the trunnion 42 and secured to the bearing block 43 by bolts 46. By this means the lower trunnions 42 of the fender supporting arms 41 are very strongly and rigidly gripped and held against turning movement; and by means of the upper grip or clamp engaged with the trunnion 40, a strong and rigid joint between the supporting arms 41 and the vertical members of the fender frame is provided. However, by taking out the upper clamp bolts 39 and backing off the nuts of the lower clamp bolts 46, and withdrawing the separable clamp members 38 and 44 sufficiently to free the teeth of the trunnions, the supporting arms 41 can be swung forwardly or rearwardly about the axes of their lower trunnions 42 to adjust the fender closer to or farther from the radiator and lamps, as the conditions of any particular installation may require. The frame bars 18 are also preferably formed with a plurality of spaced bolt holes 47 (Fig. 8), by which the fender can be adjusted vertically with relation to the clamp bases or brackets 36, to set the fender higher or lower, as conditions may require. Whenever it may be necessary to remove the fender to crank the car or for any other reason, this can be readily done by withdrawing either the upper pair of clamp blocks 38 or the lower pair of clamp blocks 44.

Preferably, and as herein shown, the fender supporting arms 41 and their upper and lower trunnions 40 and 42 are forged as single Z bars or rods; and it will be observed that the trunnions 40 and 42 are of considerable length to adapt the fender to chassis frames of varying widths.

The manner of securing the fender in position, its manner and range of adjustability, and its functional utility have already been sufficiently set forth in connection with the description of its structural features, and need not be repeated. It is believed that the manner in which the invention secures the stated objects and purposes thereof will be fully apparent to persons skilled in the art without further detailed description. The group of spaced horizontal spring fender bars 23 extending the full height of the radiator constitute in practical effect a group of resilient bumpers or buffers which afford a large measure of protection to the fragile honeycomb structure of the radiator, and the entire fender structure, including lamp guards, constitutes a neat and ornamental accessory of the car. While I have illustrated one practical physical embodiment of the invention, it is manifest that many of the structural details may be varied or modified without departing from the substance or sacrificing any of the advantages or utility of the invention. Hence, I reserve all such variations and modifications as fall within the spirit and purview of the appended claims.

I claim—

1. A radiator fender for automobiles, comprising a substantially rectangular frame, a pair of vertical tie-rods carried by said frame, and a group of spaced horizontal spring fender bars connected to and extending between said tie-rods.

2. A radiator fender for automobiles, comprising a substantially rectangular frame, a pair of vertical tie-rods mounted in the upper and lower members of said frame and equally spaced inwardly from the side members thereof, and a group of spaced horizontal spring fender bars connected to and extending between said tie-rods.

3. A radiator fender for automobiles, comprising a substantially rectangular frame, a pair of vertical tie-rods mounted in the upper and lower members of said frame equally spaced inwardly from the side members thereof, a group of forwardly bowed spring fender bars having rearwardly looped end portions terminating in eyes encircling said tie-rods, and spacing sleeves on said tie-rods between adjacent fender bars.

4. A radiator fender for automobiles, comprising a substantially rectangular frame, a pair of vertical tie-rods mounted in the upper and lower members of said frame equally spaced inwardly from the side members thereof and projecting above the top member thereof, and a group of forwardly bowed horizontal spring fender bars mounted on said tie-rods both within and above said frame.

5. A radiator fender for automobiles, comprising a substantially rectangular frame, a pair of vertical tie-rods mounted in the upper and lower members of said frame equally spaced inwardly from the side members thereof and projecting above and below the top and bottom members thereof, and a group of forwardly bowed horizontal spring fender bars mounted on said tie-rods within, above and below said frame.

6. A radiator fender for automobiles, comprising a substantially rectangular frame, a pair of vertical tie-rods mounted in the upper and lower members of said frame equally spaced inwardly from the side members thereof and projecting above the top member thereof, a group of forwardly bowed horizontal spring fender bars mounted on said tie-rods, and an upwardly bowed rod connecting the upper ends of said tie-rods.

7. In an automobile protective device of the character described, the combination with a radiator fender, of upper and lower continuous bars mounted on and crosswise of said radiator fender and at their ends extending laterally from the latter, and a pair of headlight fenders attached to and between the laterally extending ends of said bars.

8. In an automobile protective device of the character described, the combination with a radiator fender, of upper and lower continuous bars mounted on and crosswise of said radiator fender and at their ends extending laterally from the latter and a pair of headlight fenders attached to and between the laterally extending ends of said bars by means permitting adjustment of said fenders lengthwise of said bars, whereby to effect variations in the spacing of said headlight fenders.

9. A headlight guard for automobiles, comprising supporting means, a rearwardly and outwardly flaring annulus formed with an integral circular rim on one edge thereof, and means for attaching said rim to said supporting means.

10. A headlight guard for automobiles, comprising upper and lower horizontal supporting bars, a rearwardly and outwardly flaring annulus formed with an integral circular rim on one edge thereof, and bolts attaching said rim at top and bottom to and between said supporting bars.

11. A radiator guard for automobiles, comprising a frame structure carrying fender bars, in combination with means for supporting said guard on the side frame bars of the chassis, comprising a pair of upwardly extending arms formed on their lower and upper ends with oppositely extending horizontal trunnions, trunnion grips mounted on said chassis frame bars engaged with said lower trunnions and trunnion grips on said radiator guard engaged with said upper trunnions.

12. A radiator guard for automobiles, comprising a substantially rectangular frame structure carrying fender bars, in combination with means for supporting said guard on the side frame bars of the chassis, comprising a pair of upwardly extending arms formed on their lower and upper ends with oppositely extending horizontal toothed trunnions, internally toothed separable trunnion clamps mounted on said chassis frame bars and gripping said lower trunnions, whereby said supporting arms can be adjusted angularly around the axes of said lower trunnions, and internally toothed separable trunnion clamps mounted on the sides of said radiator guard frame structure engaged with said upper trunnions, whereby said radiator guard can be adjusted angularly about the axes of said upper trunnions.

13. A radiator guard for automobiles, comprising a substantially rectangular frame structure carrying fender bars, in combination with means for adjustably supporting said guard on the side frame bars of the chassis, comprising a pair of upwardly extending arms formed on their lower and upper ends with oppositely extending horizontal toothed trunnions, internally toothed separable trunnion clamps mounted on said chassis frame bars and gripping said lower trunnions, whereby said supporting arms can be adjusted angularly around the axes of said lower trunnions, and vertically adjustable internally toothed separable trunnion clamps mounted on the sides of said radiator guard frame structure engaged with said upper trunnions, whereby said radiator guard can be adjusted vertically with relation to said supporting arms and angularly about the axes of said upper trunnions.

ROBERT ROY McGREGOR.